May 22, 1962  T. L. BAILEY ET AL  3,035,272
GLOVE FOR PROTECTION AGAINST THERMAL RADIATION
Filed Dec. 14, 1960
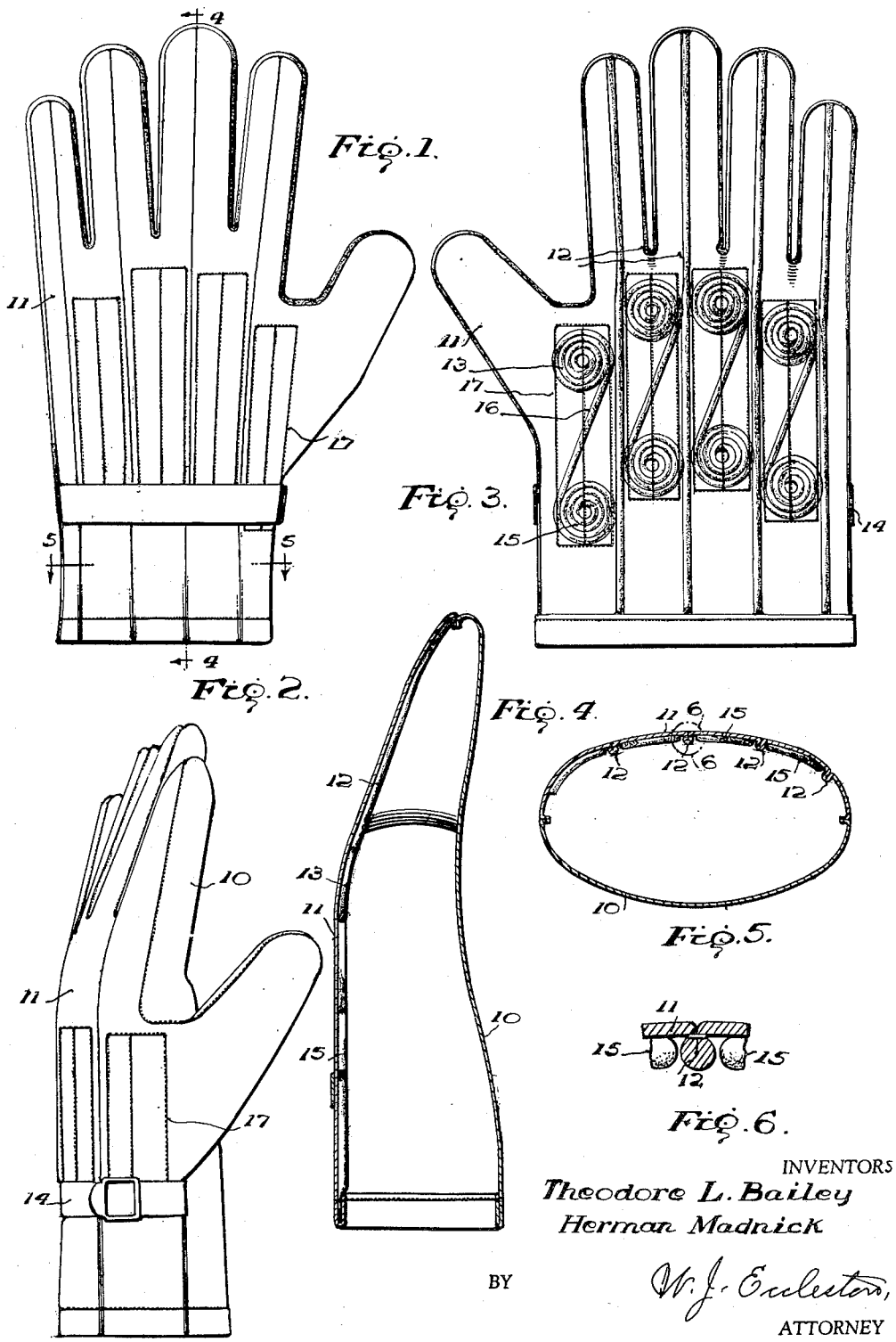
INVENTORS
Theodore L. Bailey
Herman Madnick
BY
ATTORNEY

United States Patent Office 3,035,272
Patented May 22, 1962

3,035,272
GLOVE FOR PROTECTION AGAINST
THERMAL RADIATION
Theodore L. Bailey, Natick, and Herman Madnick, Framingham, Mass., assignors to the United States of America as represented by the Secretary of the Army
Filed Dec. 14, 1960, Ser. No. 75,886
11 Claims. (Cl. 2—161)
(Granted under Title 35, U.S. Code (1952), sec. 266)

The invention described herein, if patented, may be manufactured and used by or for the Government for governmental purposes, without the payment to us of any royalty thereon.

This invention concerns a glove for protection against thermal radiation, and more particularly, a work glove of leather or similar material, so constructed as to provide a dead air space between the hand of the wearer and the back portion of the glove so as to provide a maximum of thermal insulation to protect the hand of the wearer against the effects of thermal radiation of a nuclear explosion.

As has heretofore been explained in unclassified publications on the effect of nuclear weapons, a nuclear explosion has three principal military effects, namely, blast effect, nuclear radiation, and thermal radiation. Of these, thermal radiation usually extends over a larger radius as a casualty producer than the other two (the term "casualty" is not confined to killing effect, but includes injury sufficiently severe to put a person out of action during the current battle). The thermal radiation wave resulting from a nuclear explosion travels with extreme speed, and produces intense heat momentarily.

Military clothing has been designed to protect the body to some extent against the effects of thermal radiation at a distance from the nuclear explosion where blast effect and nuclear radiation are no longer significant casualty-producing factors. Multiple layers of clothing effectively cut down the absorption of thermal energy by the body. However, protection of the hand poses a special problem in that a multi-layered glove would tend to be rather stiff, and either hamper the wearer in the accomplishment of his combat or logistical tasks, or cause him to refrain from wearing the glove even if previously instructed to do so. Furthermore, while a person can be expected to carry on his tasks even if he has a second degree burn on a non-critical portion of his body, a second degree burn on the hand effectively puts him out of action, no matter how willing and even anxious he may be to continue, since the resulting loss of manual skill prevents him from efficiently serving his weapon or other mechanical equipment.

It therefore becomes important to provide a glove for use in situations where use of a nuclear weapon by the enemy is probable or possible. Such a glove should be of simple, sturdy construction, and adapted for ordinary wear, so as to make it probable that the soldier will actually wear it at the time of a nuclear explosion, rather than keep it stored away with other personal gear. Also, such a glove should be capable of being made of ordinary material used in glove making and by ordinary glove-making machinery, so as to minimize costs and procurement lead time. Finally, and most importantly, such a glove must provide adequate protection against the flash of thermal radiation, so as to protect a person located at a sufficient distance from the detonation of a nuclear weapon, so as to be relatively safe from its casualty-producing blasts and nuclear radiation effects, while still vulnerable to its thermal effect.

With the foregoing objectives and needs in mind, we have provided a protective glove fulfilling the same, which we will now proceed to describe.

Our glove is made of leather, or other flexible sheet material having the wearing and thermally insulating properties of leather, e.g., plastic material. While not confining ourselves to any particular color, we recommend white (unless the use of that color is precluded by tactical considerations of camouflage), because of the thermal reflectiveness of white sheet material, thereby affording additional protection; where tactical considerations necessitate camouflage, a thin outer glove of olive green or similar camouflage color may be worn over our glove.

Leather (or a plastic leather substitute) has the further desirable properties of low flammability and relatively good insulating qualities against a heat flash.

The novel features of our invention are shown in the accompanying drawing, of which:
 FIGURE 1 is a rear elevation;
 FIGURE 2 is a side elevation corresponding to FIGURE 1;
 FIGURE 3 is an elevational view corresponding to FIGURE 1, but turned inside out;
 FIGURE 4 is a sectional view taken along the lines 4—4 of FIGURE 1;
 FIGURE 5 is a cross-sectional view taken along the lines 5—5 of FIGURE 1; and
 FIGURE 6 is an enlarged detail sectional view of the portion indicated as 6—6 in FIGURE 5.

The glove essentially consists of a front portion 10 and a back portion 11 of conventional shape, including five finger stalls. A plurality of thermally insulating dead air spaces is provided by a number of longitudinal ridges 12 extending internally from the back portion 11 for spacing the back portion from the hand of the wearer. These ridges extend substantially from the wrist portion to the finger tips. Four such longitudinal ridges are shown in the drawings; a fifth ridge may be included in the thumb region, but this is not as important as the other ridges, in that the thumb is ordinarily less exposed to thermal radiation than the other fingers. In order to avoid chafing, it is desirable (although not absolutely necessary) that the front portion 10 and back portion 11 each be made of a single piece of leather (or other suitable material). If this is done, the longitudinal ridges 12 are preferably made as false seams with rounded surfaces, as shown in detail in FIGURE 6.

A psychological reaction upon the occurrence of a nuclear explosion is to clench one's fist. This causes the glove to be drawn taut against the knuckles, and eliminates the dead air space protection in the knuckles region. Evidently, a second degree burn in the knuckles region would result in temporary disablement. We have therefore provided a series of auxiliary spacers 13 on the inside of the back portion of the glove intermediate the longitudinal ridges 12 in the knuckles region. These auxiliary spacers 13 have a relatively flat surface and are of flexible material having low thermal conductivity; we prefer flat braid for that purpose.

It is often desirable to provide the glove with a tightening strap 14 near the wrist opening to minimize the risk of losing the glove during strenuous activities. This has the undesirable result, from the standpoint of the present invention, to draw the glove tight against the hand near the wrist, thereby eliminating the protective dead air space locally. Therefore, if a tightening strap 14 is provided, there is preferably incorporated in the glove a second set of auxiliary spacers 15 on the inside of the back portion intermediate the longitudinal ridges 12 and relatively near the wrist opening so as to compensate for the loss of dead air space protection caused by the tightening of the strap. For ease of manufacturing, each auxiliary spacer 13 and 15 may be made upon a single cord of braid 16 which is coiled at 13 and 15; this, however, is quite optional. The braid is preferably secured to the inside of the back portion 12 by stitching 17.

It will thus be seen that we have provided a simple and highly efficient glove for protection against thermal radiation suitable for wear by soldiers, civil defense workers, and others who may find themselves exposed to thermal radiation resulting from a nuclear explosion.

It will be evident to the expert that variations and modifications of the construction shown in the drawings and described in some detail in the foregoing portion of our specification may be made without departing from the spirit of our invention, and without impairing the desirable results flowing therefrom. We thus desire to encompass such modifications and variations within the scope of our invention, and to claim the same broadly. To that end, we now define our invention by the appended claims.

We claim:

1. A glove for protection against thermal radiation, comprising a front portion and a back portion, said back portion including a knuckles portion and a wrist portion, the inside of said back portion being provided with a plurality of longitudinal ridges for spacing said back portion from the hand of the wearer and providing dead air spaces, and a plurality of flat auxiliary spacers of low thermal conductivity attached to the inside of said back portion intermediate said longitudinal ridges, said auxiliary spacers extending to the knuckles portion of said glove.

2. A glove according to claim 1, wherein said ridges extend from the wrist portion to the fingertips.

3. A glove according to claim 1, wherein said back portion is a single piece of leather and wherein said auxiliary spacers are braid.

4. A glove according to claim 1, having tightening means near the wrist portion, and wherein said spacers are also provided near said wrist portion.

5. A glove according to claim 4, wherein said back portion is a single piece of leather and wherein said auxiliary spacers are braid.

6. A glove for protection against thermal radiation, comprising a front portion and a back portion, said back portion including a knuckles portion and a wrist portion, said back portion being a single piece of leather provided on its inside with a plurality of longitudinal raised seams extending from the wrist portion to the fingertips for spacing said back portion from the hand of the wearer and providing dead air spaces, and a plurality of flat auxiliary spacers of low thermal conductivity on the inside of the back portion, said spacers being attached to said back portion intermediate said raised seams and extending to the knuckles portion of said glove.

7. A glove according to claim 6, wherein said auxiliary spacers are braid.

8. A glove for protection against thermal radiation, comprising a front portion and a back portion, said back portion including a knuckles portion and a wrist portion, said back portion being a single piece of flexible material of low thermal conductivity, said thermal conductivity not exceeding that of leather, said back portion being provided on its inside with a plurality of longitudinal raised seams extending from the wrist portion to the fingertips for spacing said back portion from the hand of the wearer and providing dead air spaces, and a plurality of flat auxiliary spacers of low thermal conductivity on the inside of the back portion, said spacers being attached to said back portion intermediate said seams and extending to the knuckles portion of said glove.

9. A glove according to claim 8, having a tightening strap near the wrist portion, and wherein said auxiliary spacers are also provided near said wrist portion.

10. A glove according to claim 9 wherein said back portion is white leather.

11. A glove according to claim 1, wherein said back portion is white leather.

References Cited in the file of this patent

UNITED STATES PATENTS

| | | |
|---|---|---|
| 889,663 | Covert | June 2, 1908 |
| 1,475,221 | Cleveland | Nov. 27, 1923 |
| 2,552,258 | Collins | May 8, 1951 |
| 2,590,015 | Kennedy | Mar. 18, 1952 |
| 2,610,326 | Sabin | Sept. 16, 1952 |
| 2,713,171 | Talbot | July 19, 1955 |
| 2,862,208 | Castro | Dec. 2, 1958 |

FOREIGN PATENTS

| | | |
|---|---|---|
| 6,980 | Great Britain | of 1895 |